(12) United States Patent
Lysaght

(10) Patent No.: US 6,450,299 B1
(45) Date of Patent: Sep. 17, 2002

(54) LOAD MEASURING FOR AN ELEVATOR CAR

(75) Inventor: Richard G. Lysaght, Hicksville, OH (US)

(73) Assignee: C.E. Electronics, Inc., Bryan, OH (US)

( * ) Notice: Subject to any disclaimer, the term of this patent is extended or adjusted under 35 U.S.C. 154(b) by 0 days.

(21) Appl. No.: 09/897,186

(22) Filed: Jul. 2, 2001

Related U.S. Application Data
(60) Provisional application No. 60/232,659, filed on Sep. 14, 2000.

(51) Int. Cl.[7] .................................................. B66B 1/44
(52) U.S. Cl. .................................................... 187/393
(58) Field of Search ................................ 187/391, 392, 187/393, 411, 292, 287

(56) References Cited

U.S. PATENT DOCUMENTS

| | | | | |
|---|---|---|---|---|
| 4,330,836 A | * | 5/1982 | Donofrio et al. | 187/392 |
| 4,674,605 A | * | 6/1987 | McPherson | 187/392 |
| 4,793,442 A | * | 12/1988 | Heckler et al. | 187/292 |
| 4,951,786 A | * | 8/1990 | Haraguchi | 187/391 |
| 4,986,391 A | * | 1/1991 | Salmon | 177/132 |
| 5,046,584 A | | 9/1991 | Yoo et al. | |
| 5,149,922 A | * | 9/1992 | Kondou | 187/392 |
| 5,306,879 A | * | 4/1994 | Pearson | 187/392 |
| 5,435,416 A | * | 7/1995 | Siikonen et al. | 187/392 |
| 5,531,294 A | * | 7/1996 | Burton et al. | 187/292 |
| 5,852,264 A | * | 12/1998 | Muller | 187/292 |
| 5,936,400 A | | 8/1999 | Tchertkov et al. | |
| 6,123,176 A | * | 9/2000 | O'Donnell et al. | 187/393 |
| 6,198,275 B1 | | 3/2001 | Wolf et al. | |
| 6,305,503 B1 | * | 10/2001 | Suzuki et al. | 177/147 |

\* cited by examiner

*Primary Examiner*—Jonathan Salata
(74) *Attorney, Agent, or Firm*—Emch, Schaffer, Schaub & Porcello Co., L.P.A.

(57) ABSTRACT

This design provides an elegant solution to elevator load weighing applications. The purpose of this control is to provide meaningful feedback pertaining to the load that is in the elevator cab. This system can accept any one of four different types of sensor for determining cab displacement. A linear potentiometer, LVDT, proximity sensor on a strain gauge may be used with this system. Load feedback is provided by these different mechanisms. Relays are provided and may be programmed, for example, to turn ON and OFF at user defined loads.

28 Claims, 5 Drawing Sheets

LOAD MEASURING FOR AN ELEVATOR CAR

This application claims the benefit of provisional application No. 60/232,659, filed Sep. 14, 2000.

TECHNICAL FIELD

This load weighing system provides a solution to elevator load weighing problems. The control/sensor provides feedback pertaining to the load in the elevator cab.

BACKGROUND OF THE INVENTION

Most elevators are housed in a cage. The cab of the elevator rests on springs at the bottom of the cage structure. As the in cabin load of the elevator increases, the springs compress. The distance from the top to the cage (which is fixed) to the top of the elevator increases as the load in the elevator increases. A system needs to account for the elevator actually becoming heavier as it travels up the shaft. Elevators have trailing cables and as the elevator rises, a system needs to compensate for the additional weight.

Another factor is knowing when the doors are open or closed. If the doors are open, the weight data is allowed to change, since elevators are not allowed to move with the doors open. If the doors are closed, the last weight that was captured with the doors open is held. Once the doors close, the weight will not change and acceleration of the elevator could throw the reading off.

Other controls take information from this load sensing board. The motor control might use the information to determine how much power is needed for take off torque. The elevator control may stop the elevator if the load is too great. Also, if the elevator is somewhat full and is traveling, the control may decide to dispatch other elevators to incoming calls instead of having a full elevator stop and service the call.

BRIEF SUMMARY OF THE INVENTION

This design provides an elegant solution to elevator load weighing applications. The purpose of this control is to provide meaningful feedback pertaining to the load that is in the elevator cab. This system can accept any one of four different types of sensor for determining cab displacement. A linear potentionmeter, LVDT, or proximity sensor may be used with this system. Load feedback is provided by these different mechanisms. Five relays are provided and may be programmed to turn ON and OFF at user defined loads. A current loop is available to transmit load information. The loop is set to 4 mA when the load is zero. A 20 mA value is a user-definable value that can be set to any value up to 200% of the maximum elevator load. Serial information is also available. The serial port may be set up to constantly transmit load information over the serial link. The system may receive information pertaining to floor, door position, and direction through MICRO COMM® link or through discreet optically isolated inputs. The opto-isolators can be configured to handle AC or DC voltages in many ranges. MICRO COMM® is a registered trademark for elevator controls and floor indicators.

DETAILED DESCRIPTION OF THE INVENTION

This process and apparatus for the measurement of elevator load uses a load measuring apparatus. The elevator comprises an elevator car travelling along guide rails in an elevator shaft, a counter-weight, a hoisting machinery, a control unit, and hoisting cables attached at least by one end to an anchorage in the elevator shaft. A load measuring apparatus comprises any one of four different types of sensor for determining cab displacement. They are a linear potentiometer, LVDT, proximity sensor, or strain-gauge.

Sensor installation will vary slightly with the type of sensor that is being installed. I prefer that the sensor installation be at the lowest landing that the elevator services. The trailing cables add weight to the elevator as it travels to upper floors. Any addition or reduction of weight can be compensated for at each landing. To get the most out of the sensor and to keep the installation simple, install the sensor at the lowest landing the elevator services.

All four sensor types perform the same function. The sensors measure the displacement of the elevator from a known position. Most elevators are housed in a type of cage structure. At the bottom of the cage, springs support the elevator. These springs compress as the load in the elevator increases. A bracket affixes the sensor in place by attaching it to the beam that runs across the top of the elevator cage. The sensor body then stays in a fixed position above the elevator roof. The distance between the sensor installation bracket and the elevator roof will fluctuate as the load increases and decreases. The sensor measures this displacement and the control converts that information into weight.

Figure 1:
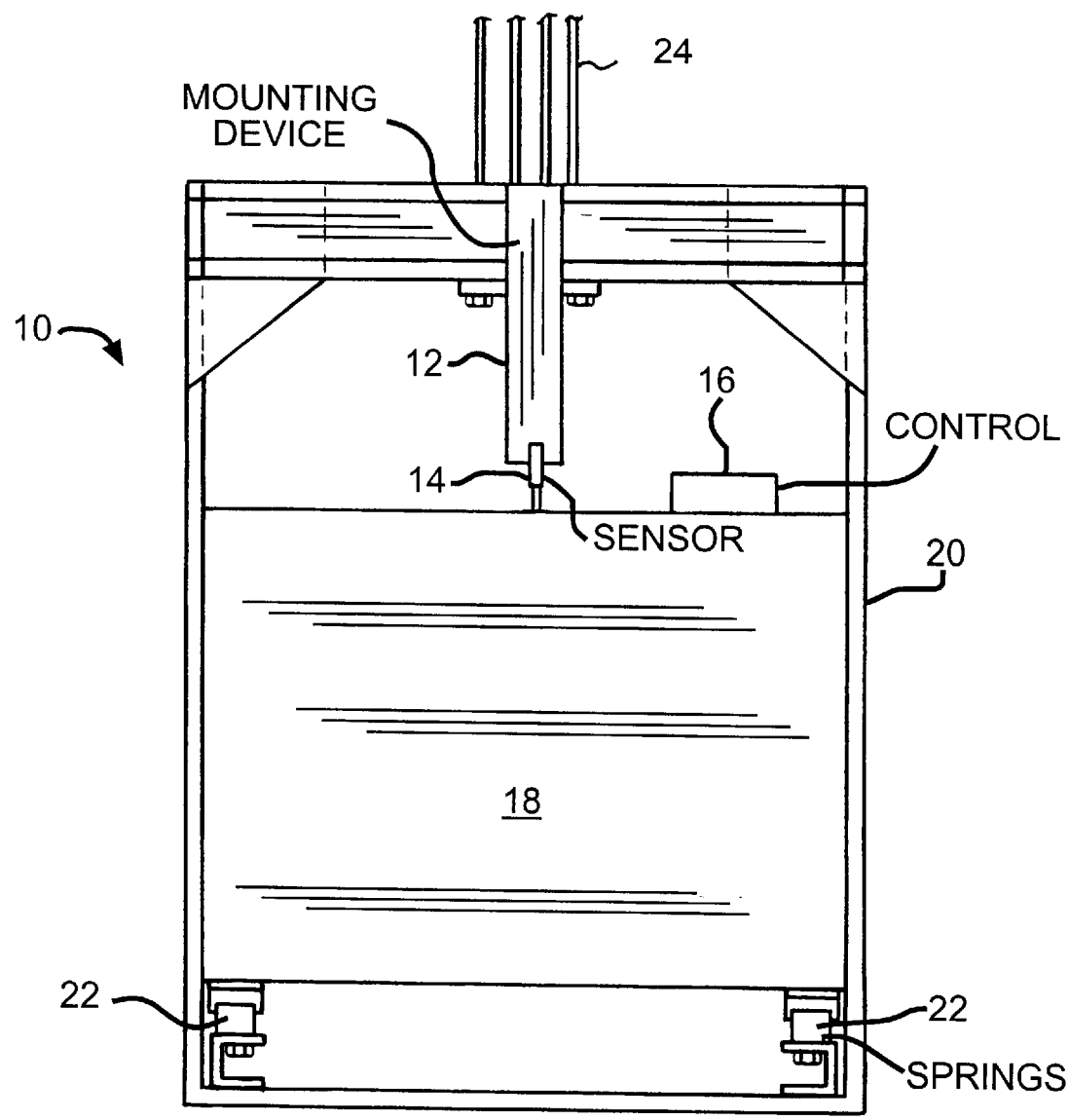
FIG. 1 is a perspective view of an elevator car and the load weighing system of this invention.

FIG. 1 is a perspective view of an elevator car and the load weighing system of this invention. FIG. 1 shows elevator car assembly 10. FIG. 1 also shows mounting device 12, sensor 14, box 16 with control board inside, elevator cab or car 18, elevator cradle or cage 20, springs 22 and cables 24.

Figure 2:
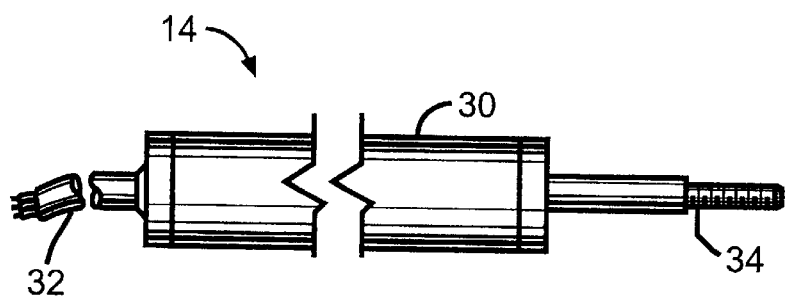
FIG. 2 is a perspective view of a linear potentiometer sensor.

FIG. 2 is a perspective view of a linear potentiometer sensor (linear position transducer 14). Sensor 14 includes housing 30, jacketed electrical cable 32 and connector cable 34. Cable connects sensor 14 to box 16. Sensor 14 has the following properties:

| MODELS | A | B |
|---|---|---|
| MECHANICAL | | |
| Total Mechanical Travel | 1.05 to 10.05 in. (min) 26.7 to 255.3 mm (min) | .55 to 6.05 in. (min) 13.9 to 153.7 mm (min) |
| Starting Force | 1.0 oz (max) | |
| ELECTRICAL | | |
| Independent Linearity | 1.0 oz (max) | |
| Total Resistance | 1000_/in. electrical trave | 1500_/in. electrical trave |

-continued

| MODELS | A | B |
|---|---|---|
| Resistance Tolerance | | 20% |

Figure 3:
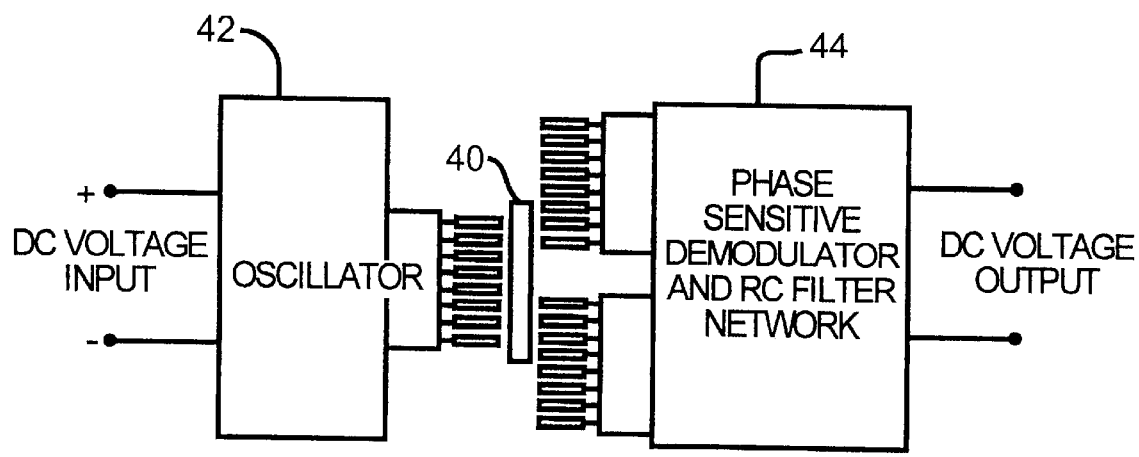
FIG. 3 is a block diagram of an LVDT sensor.

FIG. 3 is a block diagram of LVDT sensor 14. LVDT 14 is an integrated package consisting of precision linear variable differential transformer 40, solid state oscillator 42, and phase-sensitive demodulator 44. The transducer is designed for excellent linearity, infinite resolution, and high sensitivity. Input and output circuits are electrically isolated from each other and from the coil assembly housing, making them usable directly in floating or ground return systems. DC indicators, recorders, and control systems can usually be driven directly by the large DC output. The core, when displaced axially within the coil assembly, produces a voltage change in the output directly proportional to the displacement.

Figure 4:
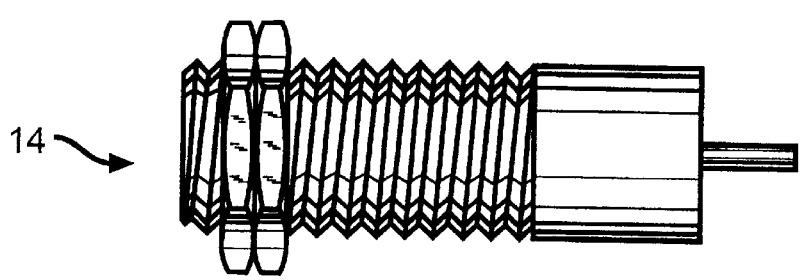
FIG. 4 is a perspective view of a proximity sensor.

FIG. 4 is a perspective view of proximity sensor 14. The analog proximity sensors provide either a DC output voltage or a 4–20 mA output current, which varies inversely as a function of distance to a metal target. Response is linear from 4" to 9".

Figure 5:
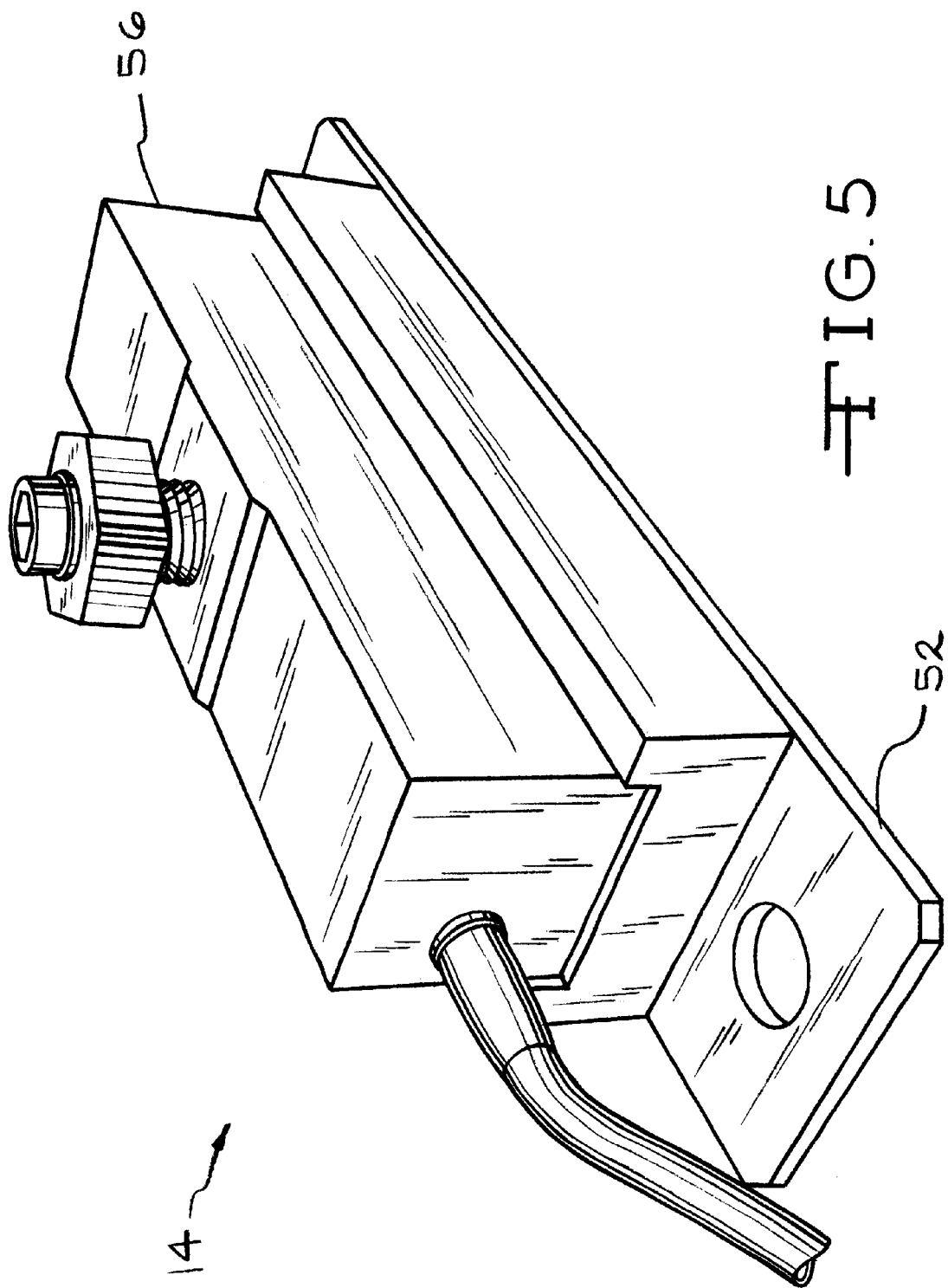
FIG. 5 is a view of a strain-gauge.

FIG. 5 is a view of strain-gauge 14.

Figure 6:
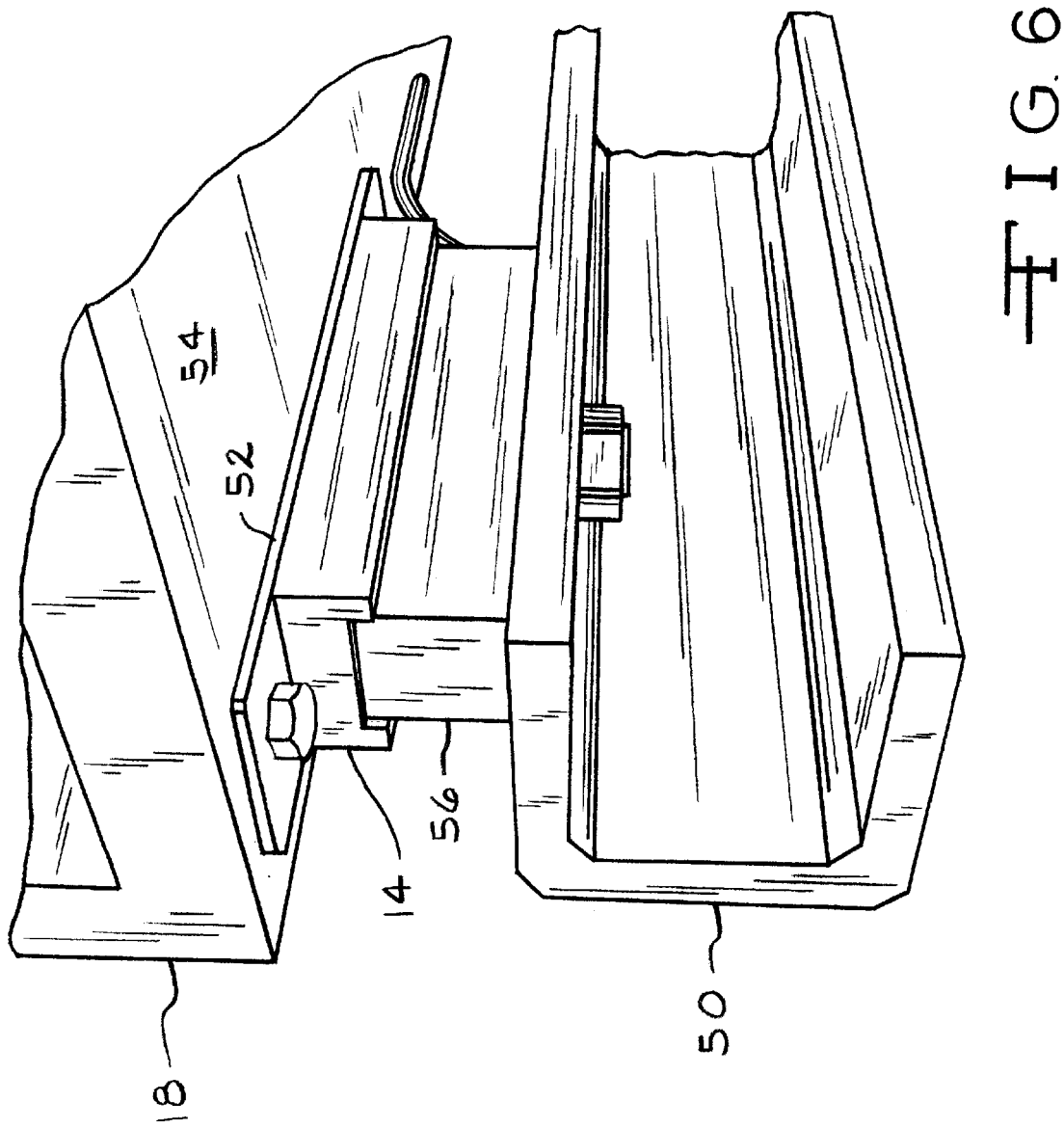
FIG. 6 shows a strain-gauge sensor in place between the elevator car and a support beam.

FIG. 6 shows strain-gauge sensor 14 in place between elevator car 18 and support beam 50 of cage 20. Sensor 14 is an aluminium sensor designed to work under compression. It comprises fixed drilled base 52 to floor 54. of car 18. Silentblock 56 absorbs any vibrations and threaded bolt 58 fixes sensor 14 to the car support beam 50. The installation of this cell is carried out by replacing the car bearing points by the number of cells. Usually four sensors are needed in order to fix the frame, or two active sensors and two dummy sensors.

Another strain gauge sensor is specifically designed to work under compression beneath one of the legs of the bedframe after removing the shock absorber. This sensor measures the weight increase of the parts hanging from the bedframe. The sensor must be located under the leg next to the suspension ropes of the car.

Another strain gauge is a hydraulic sensor based in a direct coupling between the cabin frame and its piston rod. This is designed for cars using a hydraulic piston instead of cables.

Figure 7:
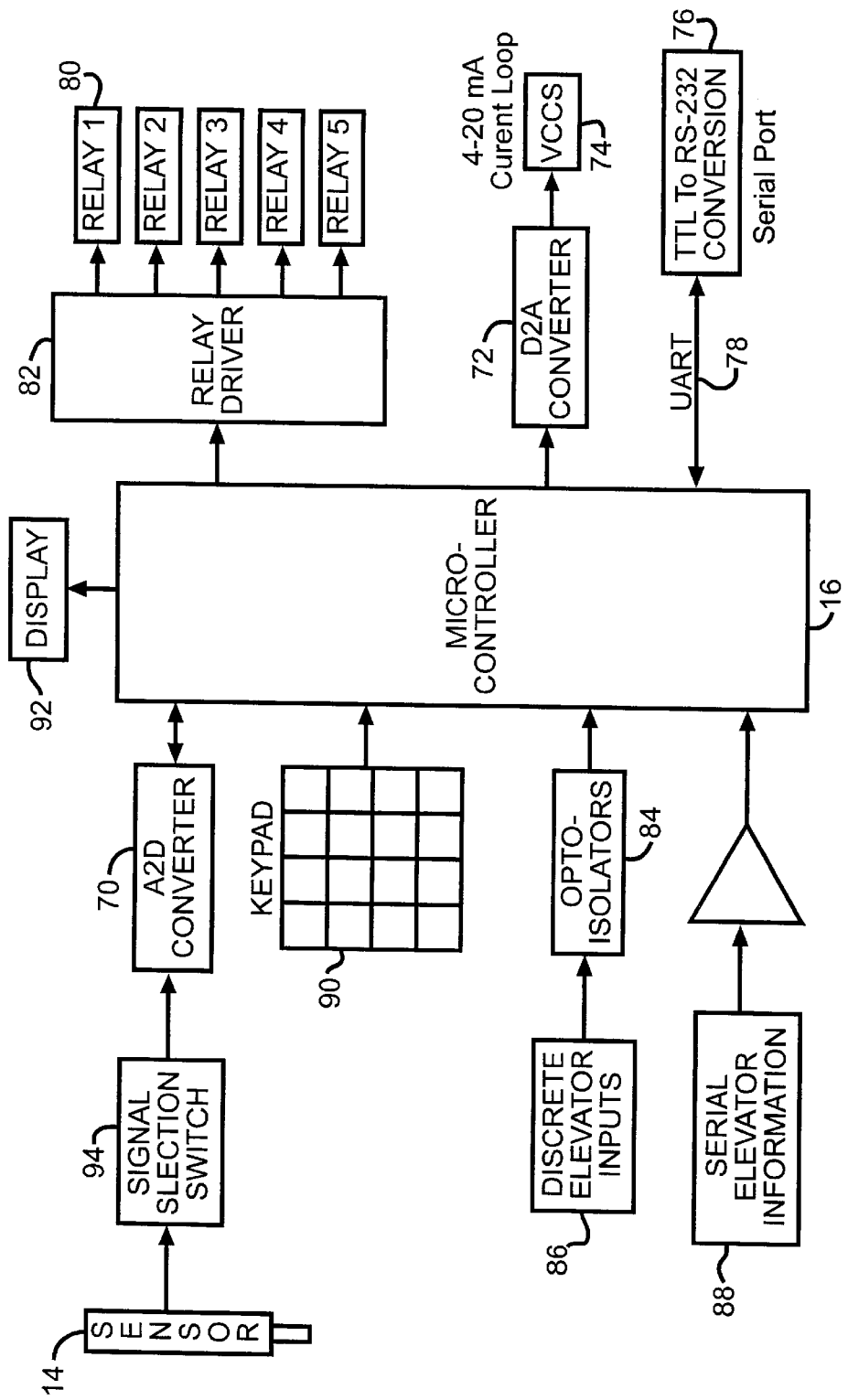
FIG. 7 is a diagram explaining the load measuring operation of the present invention.

FIG. 7 is a diagram showing the load measuring operation of this invention. A/D converter 70 receives an output signal from sensor 14 and convert them into binary code for use by control 16. A/D converter 72 connects 4–20 mA current loop 74 to control 16. Serial port 76 transmits load information over serial link 78. Relays 80 are programmed to turn ON and OFF at user defined loads. Driver 82 converts Relays 80 to control 16. Opto-isolators 84 transmit inputs 86 to control 16. MICRO COMM input 88 also provides elevator information to control 16. An operator gives instructions to control 16 through Keypad 90 and Display 92 displays the information. Signal switch 94 provides a signal selection switch depending upon which sensor 14 is.

Both the linear potentiometer and the LVDT operate in a similar fashion. Their bodies are shaped like pistons. They both have an arm extending from their body and as that arm is extended, the output of the transducer changes. To install either of these sensor types, the bracket that holds the sensor should be mounted to the cage's upper beam in such a manner that the piston arm is extended approximately ⅛th of an inch. This installation should be performed with the elevator empty. The pig-tail should be connected to the appropriate connector on a board and the corresponding dip-switch turned on.

Proximity sensors are dependent upon being installed above a metal target in order to work properly. The metal lid supplied with the sensor is an ideal target. If the roof of the elevator is a ferrous metal, that should also work just as well. The bracket that holds the proximity sensor should be installed such that the sensor is 0.4 inches above the metal target. Once again, this installation should occur at the lowest landing the elevator services and the elevator should be empty. The output of the proximity sensor is only linear over a 0.4 inch to 0.9 inch range. If the maximum deflection of the elevator is close to or greater than ½ inch, a proximity sensor should not be used. The proximity sensor's pig tail should be plugged into the corresponding connector. The DIP-switch labeled PROX should be turned ON and the POT and LVDT DIP-switches should be turned off.

The load weighing system needs to receive floor, door and direction information in order to work properly. This information can be received from either MicroComm or discrete optically isolated inputs.

The MicroComm input is by far the easiest means to receive all the required signals for elevator position, travel or door position. If a MicroComm link is available, using it will simplify the rest of the installation process. Micro-Comm information is received on JP4. The DOOR signal in the MicroComm bit stream can be either asserted high or low If the DOOR signal is asserted low, the DOOR DIP-switch should be in the ON position. If the DOOR signal is asserted high, this DIP-switch should be left off. The INPUT DIP-switch should be in the ON position any time Micro-Comm is used.

The system also requires that UP, DOWN, DOOR, FLOOR and SYNC signals be provided if discrete inputs are used. A regulated +12 VDC is provided if dry contacts need wetted in order to provide these signals. Most typical signal ranges can be accommodated by changing the resistance value on the optically isolated inputs. Either AC or DC signals may be used.

The UP, DOWN, FLOOR and SYNC inputs are expected to be asserted high. When the elevator is travelling, either the UP or the DOWN signal is expected to be asserted depending on the direction of travel. As a landing is passed (or stopped), a signal is expected at the FLOOR input. One landing needs to be designated as the synchronization floor. When the elevator reaches this landing, the SYNC input should be asserted. The DOOR input can be asserted either high or low when the elevator door opens. If the signal is asserted low, the DOOR DIP-switch should be in the ON position.

The load weighing board is constantly calculating weight. But, the compensated weight (which is the weight that is used for all of the outputs) is only calculated when the elevator door is open. Once the elevator door closes, the control assumes that the elevator is moving and therefore the weight reading would be thrown off by the acceleration of the elevator.

Before the load weighing control can provide accurate information, the system must be calibrated at the sync floor and compensated for cable weight at each landing. In order to calibrate the transducer, the elevator should be parked at the landing that is going to be used as the synch floor. If the MENU button is pressed, the display will momentarily read SET UP. The UP or DOWN button should then be pressed multiple times until the display reads SENSOR. Pressing ENTER at this point will cause the display to read ZERO and flash.

At this point, the unit is expecting to see the signal from the transducer that represents the displacement of the elevator when it is empty. Therefore, be certain that the elevator is empty and that the installer is not adding a load by leaning on the elevator etc. Press ENTER to accept the ZERO value.

The control will then grab a reading for the zero point and the display will read CAL WT. The unit now expects the installer to load a known weight into the elevator. Once the known weight is in the cab of the elevator and the installer is certain that he/she is not adding any additional load to the elevator, the ENTER button may be pressed. The display will show a weight value and start flashing that value. At this point, the value that represents the load that was placed into the elevator should be entered using the number key on the keypad. When the number on the display represents the load in the elevator, press the ENTER key to save that value. Press ESCAPE to exit without storing a new value.

Be aware of the LBS/KG setting during the installation. A DIP-switch is available to toggle the unit between these two modes. If the unit is calibrated in LBS, it can still be run in KG mode as long as the correct value was entered during the calibration mode. The same holds true for KG mode. Reverting back to the main display mode will help the installer ascertain that the unit is functioning correctly. Using the ENTER button, toggle through the main modes until the LIVEWT mode is reached. In this mode, the live uncompensated weight is displayed. If the calibration weight is still in the elevator, the display should read that value. Once the weight is removed, the display should return to near zero.

The SYNC floor performs two function. If floor information is being given to the control discretely, the SYNC floor realigns the floor count. Once the SYNC floor is set, every time the SYNC input is asserted, no matter what the control thinks the current floor is, the floor value is set to the SYNC floor value.

The second function performed by the SNYC floor is to supply a place to re-zero the displacement transducer. If the elevator sets at the SYNC floor with the doors closed long enough, the control assumes it is empty and re-zeros the transducer. This helps to compensate for any transducer drift over long periods of time. This re-zeroing feature maybe turned off in software.

In order to program the SYNC floor, press the MENU button and the display will read SET UP. Press the UP or DOWN button several times until the display read SYNCFL. Press the ENTER button. The display will read FLR and the current SYNC floor value will be flashing on the right hand side of the display. At this point, the keypad can be used to enter a new SYNC floor value. When the appropriate value is entered, press the ENTER button and the SYNC value will be stored in memory.

As the elevator travels further and further up the shaft, its load increases. This additional load needs to be subtracted from the load in the elevator in order to yield an accurate reading. In order to accomplish this, a compensation value or tare value can be taken at each landing. To program the compensation weights for each landing, press the MENU button and the display will read SET UP. Then,. press the UP or DOWN button several times until the display reads COMPWT. Once the display reads COMPWT, hit the ENTER button. After the ENTER button has been pressed, the display will toggle between the floor the elevator is on and the compensated weight for that floor. Pressing ENTER at this point will que the control to calculate the zero point for that landing. Be sure no weight is in the elevator when this function is performed. There is no reason to exit and re-enter this mode if this compensations need to be performed on several landings. The display will continue to toggle between the floor information and the compensation weight. If the elevator travels up or down, the floor information will be updated and another compensation can be performed. Press ESCAPE to exit without storing a new value.

The max weight value should be programmed to represent 100% of the elevator's maximum load. All of the output functions use this value to determine their state. For example, if one of the relays is programmed to turn on at 80% load and the max weight is set to 10,000 lbs., that relay will turn on when the load reaches 8,000 lbs. To program the max weight, press the MENU button. Press the UP or the DOWN button until the display reads SETMAX and then press ENTER. The display will be flashing and displaying the current value for max weight. Use the numeric values on the keypad to alter this value. Press ENTER to store a new value for max weight. Press ESCAPE to exit without storing a new value.

There are six relays on the load weighing board. One relay is used to indicate that the transducer is malfunctioning. This is the sensor warning relay. The other five relays are all user programmable. Each of the programmable relays can be configured to turn on at a certain percentage of the max weight and turn back off at another percentage. The relays are all dry contacts. Both a normally open and a normally closed contact are available for each relay. In order to be used properly, the installer will want to apply some voltage to the relay common and then select either the normally open or normally closed contact for use with their system. The relays are capable of handling 250 VAC at 10 A.

To program the ON/OFF loads for a relay, press the MENU button. Press the UP or DOWN button several times until the display reads RELAYS then hit the ENTER key. The display will read RELAY and a number will be flashing. Use the keypad to select the number of relay that needs to be edited, then press ENTER. Briefly, the relay will read PCT ON then the display will read R, the relay number, and a percentage that represents the amount of load that will turn that relay on. The display reads R3 80.0. This means that the Relay 3 will turn on when the load reaches 80.0% of the max weight. The installer can use the keypad at this time to adjust this value. Pressing ENTER will store this new value to memory. After ENTER is pressed PCT OFF followed by R, the relay number, and the OFF percentage will appear on the display. This value represents the load at which the relay will turn back off. The keypad may be used to alter this value. It is advised that the ON value is slightly greater than the OFF value for the Output Relays. Setting these values to close together can cause the relay to chatter. If the OFF value is programmed to be a number greater than the ON value, the control will display VALERR and will not store or use the new values.

A 4–20 mA current loop is available to supply information to external controls. The loop will generate 4 mA when the load in the car is zero. The percent load at which the loop generates 20 mA is programmable. To adjust load at which the loop will generate 20 mA, press the MENU button. Press the UP or DOWN button several times until the display reads 20 MA, then press ENTER. The display will read MA and some percentage (the percentage portion will be flashing). Using the keypad, the percentage can be adjusted from 0–200.0%. Once the current loop is programmed, the output will follow this formula: PI=% Load; Pc=20 mA Programmed Load: I=Output Current (mA) I=(PI*16/Pc)+4.

RS-232 and RS-485 ports are available on the load weighing board. A switch selects which port is in use. Data pertaining to the load in the elevator is transmitted over a serial port ten times each second. The data is structured in the following format:

| Header | OXAO |
|---|---|
| Length | OXOC |
| Command | OXFO |
| Data Byte 1 | MSB of Live Weight |
| Command | OXFO |
| Data Byte 1 | MSB of Live Weight |
| Data Byte 2 | Middle Byte of Live Weight |
| Data Byte 3 | LSB of Live Weight |
| Data Byte 4 | MSB of Compensated Weight |
| Data Byte 5 | Middle Byte of Compensated Weight |
| Data Byte 6 | LSB of Compensated Weight |
| Data Byte 7 | MSB of Percent Load |
| Data Byte 8 | LSB of Percent Load |
| Checksum | 2's Compliment Checksum |

Communication on the serial port is bidirectional. Therefore, the unit can be programmed by external means (i.e. computer program or external serial device).

Six test modes exist within the load weighing control board. These modes were included in the software with factor tests in mind, however, a situation may arise in the course of installing a unit in which accessing one or more of the test modes may be helpful. In order to enter the TEST modes, the unit should be taken out of any other program mode. This can be accomplished by pressing the ESCAPE button several times. Once all the program modes are excited, the TST DIP-switch can be placed in the ON position. The display will read TSTMOD and begin to flash. Using the UP and DOWN button, the user can select the desired test mode.

In order to run the display test, enter the test mode as described above and press the UP or DOWN key until the display reads DSPLAY. Then press the ENTER key. The display will begin showing each ASCII character that it can generate one at a time. Each character will remain on the display for approximately one second. Pressing the ESC key will allow the program to exit this routine.

A routine that tests the keypad can be accessed within the TEST modes. Enter the TEST modes as described above and press the UP or DOWN key until the display reads KEYPAD. Pressing ENTER at this point will force the display to go blank. The display will reflect each key that gets pressed in this mode. Pressing ESC will force the display show SSSSSS until the key is released and then the program will exit this test.

The discrete inputs can be tested within the test modes. To access this test, enter the TEST modes as prescribed above and using the UP or DOWN key, select OPT IN. Once OPT IN is on the display, press ENTER and select the test. A hexadecimal number appears in the center of the display. This number represents the discrete inputs that are being asserted. If no inputs are being asserted, the display will read 00. Each additional input will add to this value in the following manner:

| UP | Add 0 × 10 |
|---|---|
| DOWN | Add 0 × 08 |
| DOOR | Add 0 × 04 |
| FLOOR | Add 0 × 02 |
| SYNC | Add 0 × 01 |

In order to test the current loop, any load that is attached to JP3 should be completely disconnected. Also, the DIP-switch labeled TST420 should be placed in the ON position. (Remember to turn this DIP-switch off when the test is over). This DIP-switch places a known load across the current loop so that its value can be measured and displayed. Place the unit in TEST mode as described above. Use the UP and DOWN keys until the display reads 4 20 MA and then press ENTER. The circuit will be generating 20 mA at this point and displaying the current that is passing through the test resistor. If the display does not read 20.00, the potentiometer marked R48 can be adjusted until it does.

Pressing ENTER at this point will force the unit to generate 4mA and display the resulting current. The installer can toggle back and forth between generating 20 mA and generating 4 mA by pressing the ENTER key. Once the calibration is complete, pressing ESC will allow the software to exit this mode.

The transducer's input circuitry can be tested by selecting the test mode labeled ANALOG and then pressing ENTER. Once in this mode, the display will read the voltage that is being generated by the position transducer. As the position of the transducer changes, this reading should fluxuate accordingly. Press ESC allows the program to exit this test.

Accessing the relay routine allows the keypad to control the state of the relays. Enter the test mode as described above and use the UP and DOWN keys to select the RELAYS test. Once there, press ENTER. The display will read RELAY 0. Pressing the 1 key will force Relay 1 ON. Release the key and the relay will turn back OFF. Each relay can be tested in this manner. In order to test the Warning Relay, press the 6 key. When the test has been completed, press the ESC key. The unit may be taken out of TEST mode at any time by returning the TST DIP-switch to the OFF position.

The analog input typically handles a potentiometer based sensor, an LVDT, and a proximity sensor. That input also could use a strain-gauge. In a situation where the elevator is not mounted on bushings or is hydraulic, a strain gauge sensor could be mounted in one of several locations (under the elevator, in the control room under the motor, and the like. This strain gauge would give the same analog output with increased load and could be compensated for in the case of trailing cables just like the other configurations.

After the board has information that pertains to weight, it can use this information to provide meaningful feedback. There are relays on the board that can be programmed to turn on at a certain load and then turn back off at another load (providing a dead-band or hystersis). For example, the user might use this feature to give feedback when the elevator is at 50% load, 80% load, 100% load, and 120% load. Using this information the elevator controller can choose to dispatch lighter elevators to service calls. Also, if the elevator is in an overload situation, an audible message can be played in the cab until the load drops below 100%.

The board also may have circuits that will provide a 4–20 mA current loop based upon the load in the elevator. If the loop read 4 mA, the load is at zero. The 20 mA point however is programmable to any value from 0% load to 200% load. So, the installer could choose to make the 20 mA point be at 150% load (so when the load is at 75% 12 mA will flow through the loop). Using this analog signal (which can be used over a great distance, like the distance from the elevator to the control room) the elevator can choose to dispatch elevators based on load and the like.

Also, a serial port on the unit that may be configured as an RS-232 or RS-485 port. This port will constantly give serial information pertaining to the weight.

Another unique automatic zero feature is as follows. the installer can program in the floor where the elevator will rest when it's not in use. If the elevator will rest when it's not in use. If the elevator sits at that floor for an extended period of time with its doors closed, the controller will re-zero. This allows the circuit to actively compensate for changes in temperature and in the sensor.

In addition to these embodiments, persons skilled in the art an see that numerous modifications and changes may be made to the above invention without departing from the intended spirit and scope thereof.

I claim:

1. An elevator comprising:
   an elevator car having a load;
   a sensor body in a fixed position adjacent the elevator car;
   a sensor located in the sensor body for measuring the load of the elevator car and for sending an output signal representing the load of the elevator car;
   a control connected to the sensor for receiving the output signal from the sensor, the control also connected to the elevator car for controlling the elevator car using the output signal from the sensor; and
   cables having a weight connected to the elevator car;
   wherein the control is configured to compensate for at least one parameter in the output signal from the sensor.

2. An elevator according to claim 1 wherein the compensated parameter represents a vertical distance between the sensor and the elevator car.

3. An elevator according to claim 1 wherein the control is configured to identify fluctuations in the load between the sensor and the elevator as the load increases and decreases.

4. An elevator according to claim 1 including an elevator cage housing the elevator car wherein the elevator cage has a top and a bottom wherein the sensor body is fixed to the top of the cage.

5. An elevator according to claim 3 wherein the top of the elevator cage includes a beam and the sensor body is attached to the beam.

6. An elevator according to claim 1 wherein the control includes relays that are programmed to turn on at a certain first load and turn off at a different second load.

7. An elevator according to claim 1 wherein the control includes a 4–20 mA current loop based upon the load in the elevator.

8. An elevator according to claim 1 wherein the control includes a serial port that is configured as an RS-232 or RS-485 port to give serial information pertaining to the load of the elevator.

9. An elevator according to claim 1 wherein th e control is configured to compensate for changes in temperature and in the sensor.

10. An elevator according to claim 1 wherein the control is configured to re-zero when the elevator is at rest and not in use for an extended period of time with the elevator doors closed.

11. An elevator according to claim 1 wherein the control is configured for receiving the output signal from the sensor, for storing compensation values for the parameter, and for automatically compensating the output signal from the sensor to a compensated output signal.

12. An elevator according to claim 1 wherein the compensated parameter represents a vertical distance from the sensor's fixed location to the elevator when the elevator is at the lowest landing.

13. An elevator according to claim 1 wherein the compensated parameter represents additional weight for trailing cables at landings above the lowest landing.

14. An elevator according to claim 1 wherein the sensor is a linear potentiometer sensor.

15. An elevator according to claim 1 wherein the sensor is a LVDT sensor.

16. A process for measuring an elevator load comprising the steps of:
    providing an elevator car having a load;
    fixing a sensor body in a fixed position adjacent the elevator car;
    providing a sensor located in the sensor body;
    measuring the load between the sensor and the elevator car with the sensor;
    connecting a control to the sensor;
    also connecting the control to the elevator car;
    sending an output signal representing the load of the elevator car from the sensor to the control;
    receiving the output signal from the sensor with the control;
    controlling the elevator car using the output signal from the sensor;
    connecting cables to the elevator car; and
    configuring the control to compensate for at least one parameter in the output signal from the sensor.

17. A process according to claim 16 wherein the compensated parameter represents a vertical distance between the sensor and the elevator car.

18. A process according to claim 16 wherein the load represents a strain between the sensor and the elevator car.

19. A process according to claim 16 including the step of the control identifying fluctuations between the sensor and the elevator car as the load increases and decreases.

20. A process according to claim 16 wherein the measuring is carried out at the lowest landing the elevator services.

21. A process according to claim 17 wherein the vertical distance varies between 0.25 inch and 1.0 inch.

22. A process according to claim 16 including the steps of:
    providing an elevator cage with a top and a bottom;
    housing the elevator car with the elevator cage; and
    fixing the sensor body to the elevator cage.

23. A process according to claim 16 wherein the compensated parameter represents a vertical distance from the sensor's fixed location to the elevator when the elevator is at the lowest landing.

24. An elevator according to claim 2 wherein the compensated parameter also represents additional weight for trailing cables at landings above the lowest landing.

25. A process according to claim 16 wherein the compensated parameter represents additional weight for trailing cables at landings above the lowest landing.

26. A process according to claim 17 wherein the compensated parameter also represents additional weight for trailing cables at landings above the lowest landing.

27. A process according to claim 16 wherein an LVDT sensor sends the output signal.

28. A process according to claim 16 wherein a linear potentionmeter sends the output signal.

* * * * *